(12) United States Patent
Brown et al.

(10) Patent No.: US 8,265,259 B2
(45) Date of Patent: Sep. 11, 2012

(54) FUNCTIONALITIES FOR LOCAL NUMBER PORTABILITY IN A TELECOMMUNICATIONS NETWORK

(75) Inventors: Gregory K. Brown, Broomfield, CO (US); James Carlson, Boulder, CO (US); Maria Farnon, Denver, CO (US); Greg A. Land, Arvada, CO (US); Bill Long, Louisville, CO (US); Troy D. Lynette, Broomfield, CO (US); Richard D. Moore, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1197 days.

(21) Appl. No.: 11/929,589

(22) Filed: Oct. 30, 2007

(65) Prior Publication Data

US 2008/0130840 A1    Jun. 5, 2008

Related U.S. Application Data

(60) Provisional application No. 60/855,485, filed on Oct. 31, 2006, provisional application No. 60/941,102, filed on May 31, 2007.

(51) Int. Cl.
*H04M 7/00* (2006.01)
(52) U.S. Cl. ......... 379/221.13; 379/201.12; 379/220.01; 379/274; 379/27.02
(58) Field of Classification Search ............. 379/221.13, 379/27.01, 27.02, 220.01, 27.03, 27.04, 201.01, 379/272, 273, 274
See application file for complete search history.

(56) References Cited

U.S. PATENT DOCUMENTS

| | | | |
|---|---|---|---|
| 6,298,352 B1 * | 10/2001 | Kannan et al. | ........................ 1/1 |
| 6,438,219 B1 | 8/2002 | Karau et al. | |
| 6,473,503 B1 | 10/2002 | Karau et al. | |
| 7,720,211 B1 | 5/2010 | Winner et al. | |
| 7,881,452 B1 * | 2/2011 | Dianda | .................... 379/221.13 |
| 7,917,396 B1 | 3/2011 | Drake et al. | |
| 2003/0123637 A1 | 7/2003 | Rangarajan et al. | |
| 2003/0202638 A1 * | 10/2003 | Eringis et al. | .............. 379/15.01 |
| 2004/0223604 A1 * | 11/2004 | Kieren | .......................... 379/327 |

OTHER PUBLICATIONS

"Canada Examination Report dated Jun. 30, 2011", Canadian App. No. 2,667,837, 3 pgs.
"Canadian Office Action, dated Feb. 28, 2012", Application No. 2667837, 3 pgs.

(Continued)

*Primary Examiner* — Antim Shah
(74) *Attorney, Agent, or Firm* — John C. Heuton

(57) ABSTRACT

According to various embodiments of the present invention, systems and methods for local number portability in a telecommunication network are disclosed. An embodiment of a method includes receiving a telephone number (TN) to test for its porting activity as part of a local number portability (LNP) order, accessing a LNP call tester (LCT) to determine a current local routing number (LRN) for the TN, and determining, based on the TN and current LRN, whether the porting activity is completed for the TN in relation to a core telecommunications carrier servicing an owner of the TN. The porting activity may include at least one of port in, port out, and migration of the TN. In one embodiment, the planned porting activity for the TN associated with the LNP order is known prior to determining whether the porting activity has been completed. Other embodiments are also disclosed.

8 Claims, 11 Drawing Sheets

OTHER PUBLICATIONS

International Searching Authority, U.S. Patent and Trademark Office and Receiving Office, International Search Report (Form PCT/ISA/220) for international application No. PCT/US 07/83248, Mar. 17, 2008, 3 pages.

International Searching Authority, U.S. Patent and Trademark Office and Receiving Office, Written Opinion of the International Searching Authority (Form PCT/ISA/237) for international application No. PCT/US 07/83248, Mar. 17, 2008, 9 pages.

* cited by examiner

```
┌─────────────────────────────────────────────────────────────┐
│  (▶)TRIGGER PORTING    (▶) NEW SEARCH                       │
├─────────────────────────────────────────────────────────────┤
│ ▢CUSTOMER ORDER SUMMARY                              ○ ○ ○  │
│                                                             │
│   SUBSCRIBER NAME:            TEST COMPANY                  │
│   SUBSCRIBER ID:              497206                        │
│                                                             │
│   SERVICE ADDRESS:            2282 RUSSEL RD                │
│                               LAS VEGAS, 89119-             │
│   TELEPHONE NUMBER:           7027301396                    │
│   BILLING TELEPHONE NUMBER:   7037301395                    │
│   ORDER ID:                   4247713                       │
│   ORDER STATUS:               ACCEPTED                      │
│   ORDER ACTION:               INSTALL                       │
│   ORDER TYPE:                 NEW                           │
│   CUSTOMER'S INTERNAL ORDER ID:                             │
│   LNP ORDER:                  YES                           │
│   LNP STATUS:                 FOC RECEIVED                  │
│   ACTIVATION TYPE:            CUSTOMER-INITIATED            │
│   DEFAULT ACTIVITY:           AUTO-CANCEL AT ACTIVATION TIME│
│   ACTIVATION TIME:            12:30 MST                     │
│   ORDER SUBMIT DATE:          06/29/2005                    │
│   SERVICE DELIVERY DATE:                                    │
│   CUSTOMER COMMIT DATE:       06/29/2005                    │
│   CUSTOMER REQUESTED DATE:    07/11/2005                    │
│   BILLING START DATE:                                       │
│   BILLING STOP DATE:                                        │
└─────────────────────────────────────────────────────────────┘
```

FIGURE 7A

PARTNER GOLD MEMBER

GENERAL INFORMATION

OPERATIONS SUPPORT FOR PORT TRIGGERING ACTIVITIES IS AVAILABLE FROM 8A.M.-3P.M. MOUNTAIN TIME. ACTIVATION OR CANCELLATION OF THIS CUSTOMER ORDER OUTSIDE OF THIS TIME WINDOW WILL BE BEST EFFORT ONLY.

TRIGGERING PORTING OF THIS CUSTOMER ORDER WILL CAUSE ALL TELEPHONE NUMBERS ASSOCIATED WITH THIS CUSTOMER ORDER TO PORT.

PORTING OF THIS NUMBER IS NOT CURRENTLY AVAILABLE. REQUEST COULD NOT BE PROCESSED BECAUSE TODAY IS NOT THE SERVICE COMMENCEMENT DATE FOR THIS CUSTOMER ORDER. PLEASE RESUBMIT REQUEST ON THE INTENDED DAY OF PORT. (1909)

CUSTOMER ORDER SUMMARY                               o o o

SUBSCRIBER NAME:   TEST COMPANY
SUBSCRIBER ID:     497206
                   2282 RUSSELL RD
SERVICE ADDRESS:   LAS VEGAS, 89119-

FIGURE 8

FUNCTIONALITIES FOR LOCAL NUMBER PORTABILITY IN A TELECOMMUNICATIONS NETWORK

CROSS REFERENCE TO RELATED APPLICATIONS

This application claims benefit of priority from U.S. Provisional Patent Application Ser. No. 60/855,485, filed 31 Oct. 2006, entitled "VoIP Enhanced Local Service Active Day of Port Trigger" and U.S. Provisional Patent Application Ser. No. 60/941,102, filed 31 May 2007, entitled "Local Number Portability (LNP) Processes". Both of the aforementioned patent applications are incorporated herein by reference for all purposes.

BACKGROUND OF THE INVENTION

Local Number Portability (LNP) was defined in the Telecommunications Act of 1996 as the "ability of users of telecommunications services to retain, at the same location, existing telecommunications numbers without impairment of quality, reliability, or convenience when switching from one telecommunications carrier to another". In other words, LNP is the process by which customers request a change in underlying voice service from one telecommunications carrier to another.

LNP supports many porting options, including porting a wire line telephone number (TN) from one carrier to another carrier (referred to herein as a "core telecommunications carrier") (known as "Port In"), porting a wire line telephone number from the core telecommunications carrier to another carrier (known as "Port Out"), and porting wire line telephone numbers between customers of the core telecommunications carrier who are both using the network of the core telecommunications carrier (known as "Internal Port" or "Migration").

The Federal Communications Commission (FCC) has required that all local exchange carriers (LEC) in the 100 largest metropolitan markets provide LNP no later than the end of 1998. The LNP rules that the FCC has put in place support competitive market theory by removing the personal inconvenience of having to obtain a new phone number when an end-user moves to a new preferred service provider. Carriers must honor a porting request that is supported by an end-user's authorization.

LNP received little attention until the FCC issued the mandate requiring the implementation of LNP according to a very aggressive schedule. The solution that was chosen by the FCC to provide LNP was the Local Routing Number (LRN) method. The LRN method includes providing, in addition to the original telephone number, a new 10-digit number (the LRN) along with the identification of the CLEC to which the service has been ported, when performing LNP. When the originating central office switch consults the Service Control Point (SCP) database to route an LNP number, the original telephone number and the LRN are utilized to identify the CLEC associated with the telephone number. The originating carrier then hands off the call to the CLEC. While this approach is claimed to be faster, clearly two telephone numbers are required, thereby placing additional pressure on the North American Numbering Plan (NANP).

With the emergence of LNP as a required service of telecommunications providers, customers of the telecommunications providers may present specific needs and services as part of the LNP process that may be addressed by processes that would be beneficial to the customer. For instance, special business models that involve LNP activities outside of the core telecommunications carrier may exist. The ability to provide a functionality that allows customers who want to port their own TNs to a telecommunications carrier using non-standard procedures, such as providing the capability to perform LNP themselves or by means of a third party may be beneficial.

In addition, customers may desire additional testing techniques to improve the LNP process. For example, the ability to test whether there are any errors in an LNP order request prior to actually submitting the order would be beneficial. Also, a test to determine whether a TN has already been ported in, ported out, or migrated from the telecommunications carrier would also be beneficial.

Another problem associated with the current LNP process, is that currently customers have no control over the timing during which ports occur on the Firm Order Commitment (FOC) date for their LNP order(s). Presently, ports for LNP are automatically triggered by the core telecommunications carrier within a pre-determined product-specific window. It would be beneficial to enable customers with the ability to trigger the activation sequence of the porting process for the TNs associated with their own orders.

Currently, none of the above improved functionalities to LNP exist. A telecommunications carrier would be able to provide better products and customer service if there were capable of providing such functionalities.

SUMMARY

Embodiments of the present invention generally relate to improved functionalities for local number portability in a telecommunications network.

An embodiment of a method includes receiving a telephone number (TN) to test for its porting activity as part of a local number portability (LNP) order; accessing a LNP call tester (LCT) to determine a current local routing number (LRN) for the TN; and determining, based on the TN and current LRN, whether the porting activity is completed for the TN in relation to a core telecommunications carrier servicing an owner of the TN. The porting activity may include at least one of port in, port out, and migration of the TN. In one embodiment, the planned porting activity for the TN associated with the LNP order is known prior to determining whether the porting activity has been completed.

In an embodiment of the method the LCT is part of a network of the core telecommunication carrier. Determining whether the porting activity is completed for the TN may include analyzing the status of both the current LRN and TN. In one embodiment, if there is a target LRN for the TN and the target LRN is equal to the current LRN, then the LCT determines that the porting activity of the TN is a completed migrated.

In at least one embodiment if the TN equals the current LRN and the TN is in a block of TNs owned by the core telecommunications carrier, then the LCT determines that the porting activity of the TN is a completed port in. In another embodiment if the TN equals the current LRN and the TN is not in a block of TNs owned by the core telecommunications carrier, then the LCT determines that the porting activity of the TN is a completed port out.

An embodiment of a system includes a database to determine a local routing number associated with a TN, the TN part of a local number portability (LNP) order; and a LNP call tester (LCT) communicably coupled to the database to test a porting activity of the TN as part of the LNP order and configured to: receive the TN in order to test for its porting activity; determine the current LRN by querying the database; and determine, based on the TN and current LRN, whether the porting activity is completed for the TN in relation to a core telecommunications carrier servicing an owner of the TN.

In an embodiment of the system the porting activity may include at least one of port in, port out, and migration of the TN. The planned porting activity for the TN associated with the LNP order may be known prior to determining whether the porting activity has been completed. The LCT may be part of a network of the core telecommunication carrier. In an embodiment, determining whether the porting activity is completed for the TN includes analyzing the status of both the current LRN and TN.

An embodiment of an article of manufacture includes a computer-accessible medium including data that, when accessed by a computer, causes the computer to perform operations including receiving a telephone number (TN) to test for its porting activity as part of a local number portability (LNP) order; accessing a LNP call tester (LCT) to determine a current local routing number (LRN) for the TN; and determining, based on the TN and current LRN, whether the porting activity is completed for the TN in relation to a core telecommunications carrier servicing an owner of the TN.

In an embodiment of the article of manufacture the porting activity includes at least one of port in, port out, and migration of the TN. The planned porting activity for the TN associated with the LNP order may be known prior to determining whether the porting activity has been completed. In at least one embodiment determining whether the porting activity is completed for the TN includes analyzing the status of both the current LRN and TN.

In some embodiments if there is a target LRN for the TN and this target LRN is equal to the current LRN, then the LCT determines that the porting activity of the TN is a completed migrated. In some embodiments if the TN equals the current LRN and the TN is in a block of TNs owned by the core telecommunications carrier, then the LCT determines that the porting activity of the TN is a completed port in. In various embodiments if the TN equals the current LRN and the TN is not in a block of TNs owned by the core telecommunications carrier, then the LCT determines that the porting activity of the TN is a completed port out.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 7A and 7B are screenshots depicting an order summary display for a port triggering capability according to embodiments of the invention;

FIG. 8 is a screenshot of one embodiment of an error window associated with a port triggering capability.

DETAILED DESCRIPTION OF THE INVENTION

One or more embodiments of the present invention are related to telecommunications and, more particularly, to systems and methods for improved functionalities for local number portability (LNP) in a telecommunications network.

Figure 9:
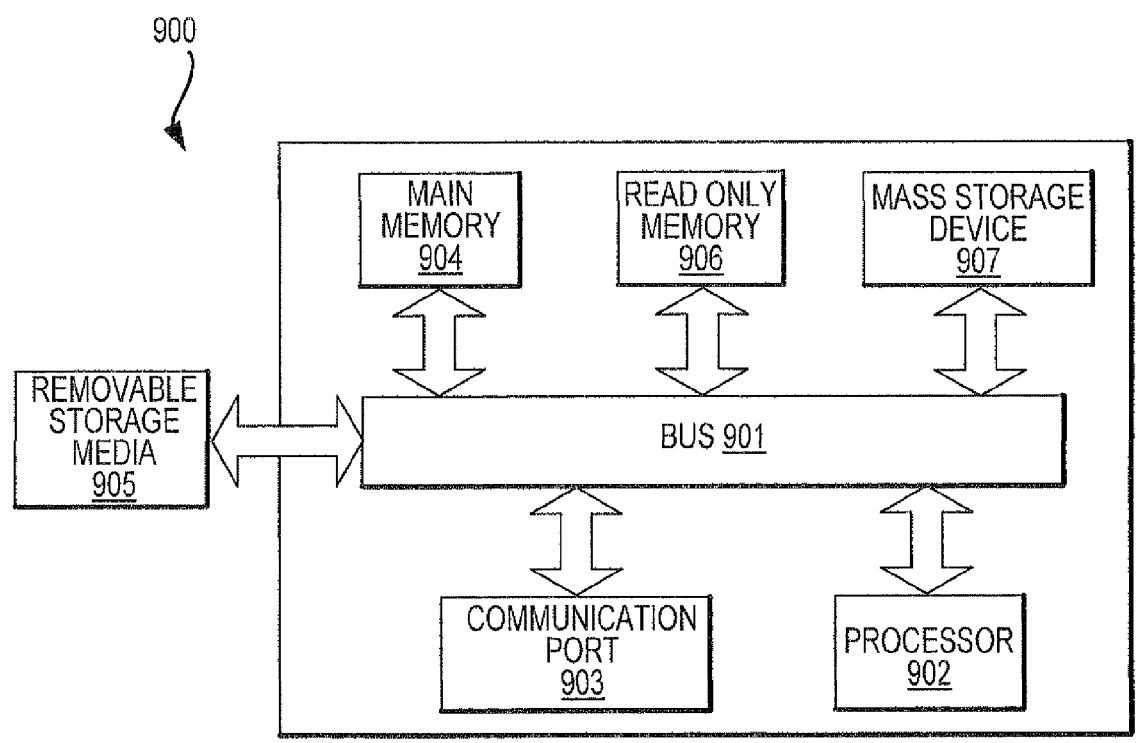
FIG. 9 is an example of a computer system with which embodiments of the present invention may be utilized.

Some embodiments of the present invention provide systems and methods for improved functionalities for local number portability in a telecommunications network. The systems and methods can be implemented using computers and computer software, such as depicted in FIG. 9, for example. Such computer software can be maintained on a computer readable medium. As used herein, the term "computer readable medium" is used in its broadest sense to mean any storage device accessible to a computer. Thus, for example, a computer readable medium can be a hard disk drive, a RAM, a floppy diskette, a CD ROM, an EEPROM, a magnetic tape, and/or the like. In some cases, the computers and/or computer software can communicate via a network. In particular, the computers can be communicably coupled to a network and/or each other. As used herein, the term "network" is used in its broadest sense to mean any system capable of passing communications from one entity to another. Thus, for example, a network can be, but is not limited to, the Internet, a virtual private network, a local area network, a wide area network, a WiFi network, a PSTN, a cellular network, and/or any combination thereof. Further, the term "communicably coupled" is used herein in its broadest sense to mean any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network, or direct coupling.

In some cases, the aforementioned systems and methods employ routing to handle calls and/or data. As used herein, the term "routing" is used in its broadest sense to mean any action taken to transfer, initiate, terminate, end, and/or direct calls and/or data. In various instances, calls are handled by network routing resources. As used herein, the terms "network resource," "network element," or "network routing resource" are used in their broadest senses to mean any device and/or software capable of routing a call and/or data, including, but not limited to, a session border controller, a gateway, a gateway controller, a softswitch, a proxy server, or a feature server. In some embodiments, calls are routed to or from switches, such as, for example, a host switch or a remote switch. As used herein, the term "switch" refers to a network routing resource or any other device capable of performing switching functions associated with placement and/or routing of calls. According to some embodiments, calls may be placed to or from communications devices. As used herein, the term "communications device" is used in its broadest sense to mean any device capable of initiating, transmitting, and/or receiving communications through a network, and includes, but is not limited to, a telephone, a fax machine, an Internet Protocol ("IP") phone, a SIP phone, and/or a wireless phone.

Embodiments of the invention provide methods and systems for improved functionalities for LNP processes. For example, embodiments of the invention provide for a local service request (LSR) bypass option, a real time (RT) customer service request (CSR) option, a port check tool (PCT), and a port triggering capability. Embodiments of the invention may also include further processes associated with improved functionalities for LNP.

A standard LNP business model of a core telecommunications carrier provides customers of the core telecommunications carrier who want to port one or more of their telephone numbers (TNs) to the core telecommunications carrier with the ability to submit orders to the core telecommunications carrier. With respect to its received LNP order, the core telecommunications may then manage all local exchange carrier (LEC) facing activities, the core telecommunications carrier TN provisioning activities, and Number Portability Administration Center (NPAC) activation activities. As referred to herein, a customer of a core telecommunications carrier may refer to another telecommunications carrier that provides telecommunications services to an end user person. In some embodiments, such a customer may include a LEC, competitive LEC (CLEC), incumbent LEC (ILEC), or any other type of telecommunications carrier. In addition, a core telecommunications carrier may include the above types of telecommunications carriers, but is not limited to such an embodiment.

Figure 1:
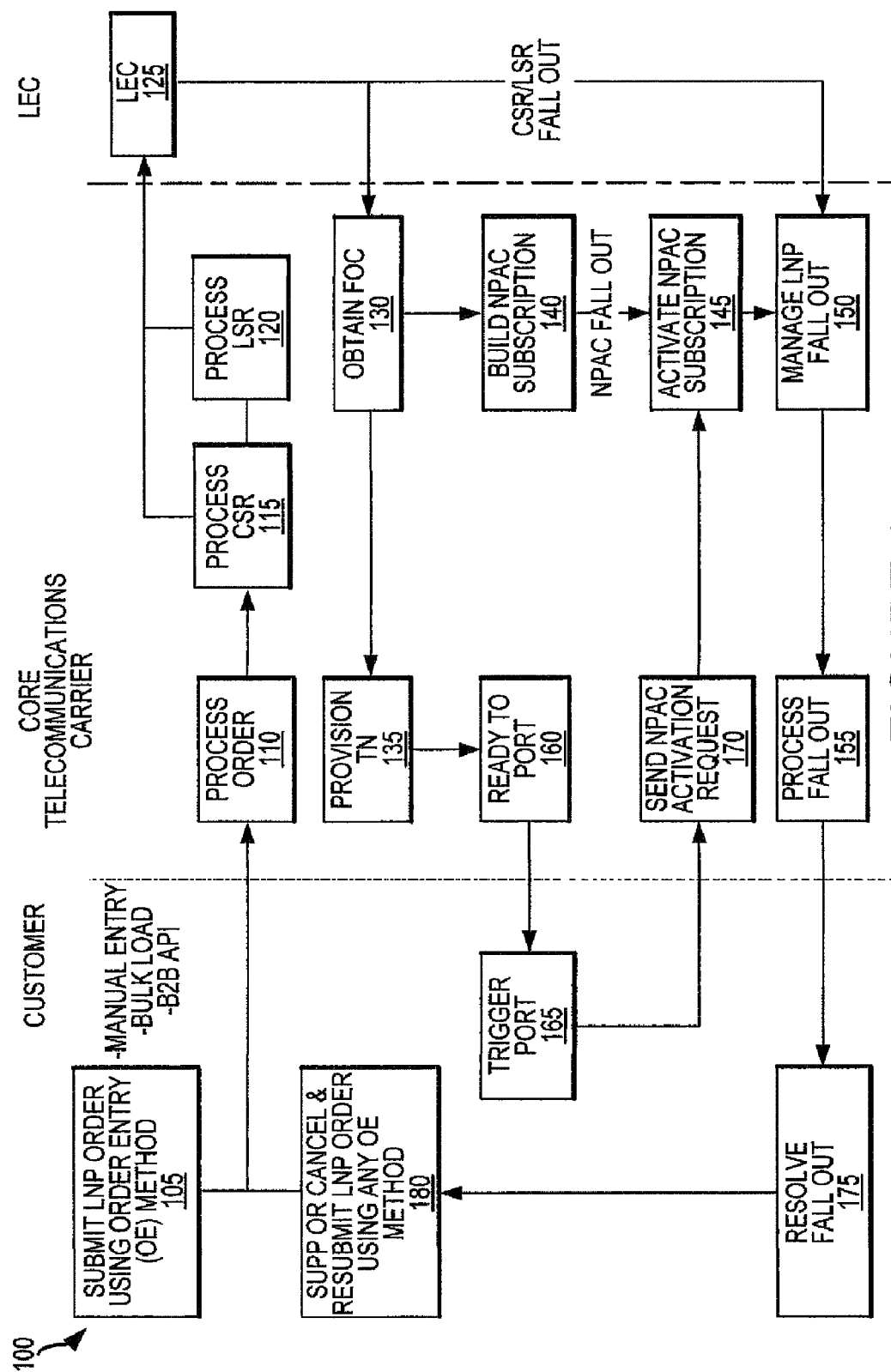
FIG. 1 is a flow diagram illustrating one embodiment of a standard local number portability (LNP) process.

FIG. 1 is a diagram illustrating one embodiment of a high-level standard LNP process 100. As shown, customers can use several order entry mechanisms to submit LNP orders to a core telecommunications carrier, such as manual entry, bulk entry, and business-to-business application programming interface (B2B API) 105, 180. As shown, the core telecommunications carrier processes the LNP order 110 and manages customer service record (CSR) 115, local service request (LSR) 120, firm order confirmation (FOC) 130 from the LEC 125, directory listing (DL) (not shown) and customer name database (CNAM) activities (not shown), but the customer should manage any fall out from these activities 175. The term "fall out" refers to errors, including but not limited to, mistakes, incompatibilities, typographical errors, inconsistencies, incorrect information, and so on.

Continuing with the standard LNP process 100 of FIG. 1, the core telecommunications carrier manages TN provisioning 135 and any associated fall out 150. In addition, the core telecommunications carrier manages activation-related NPAC activities 140, 145 and any associated fall out 150. Customers may trigger the port manually 165, or the core telecommunications carrier may trigger the port automatically 160. The core telecommunications carrier automatically submits the activation request to the NPAC 140, 145.

Figure 2:
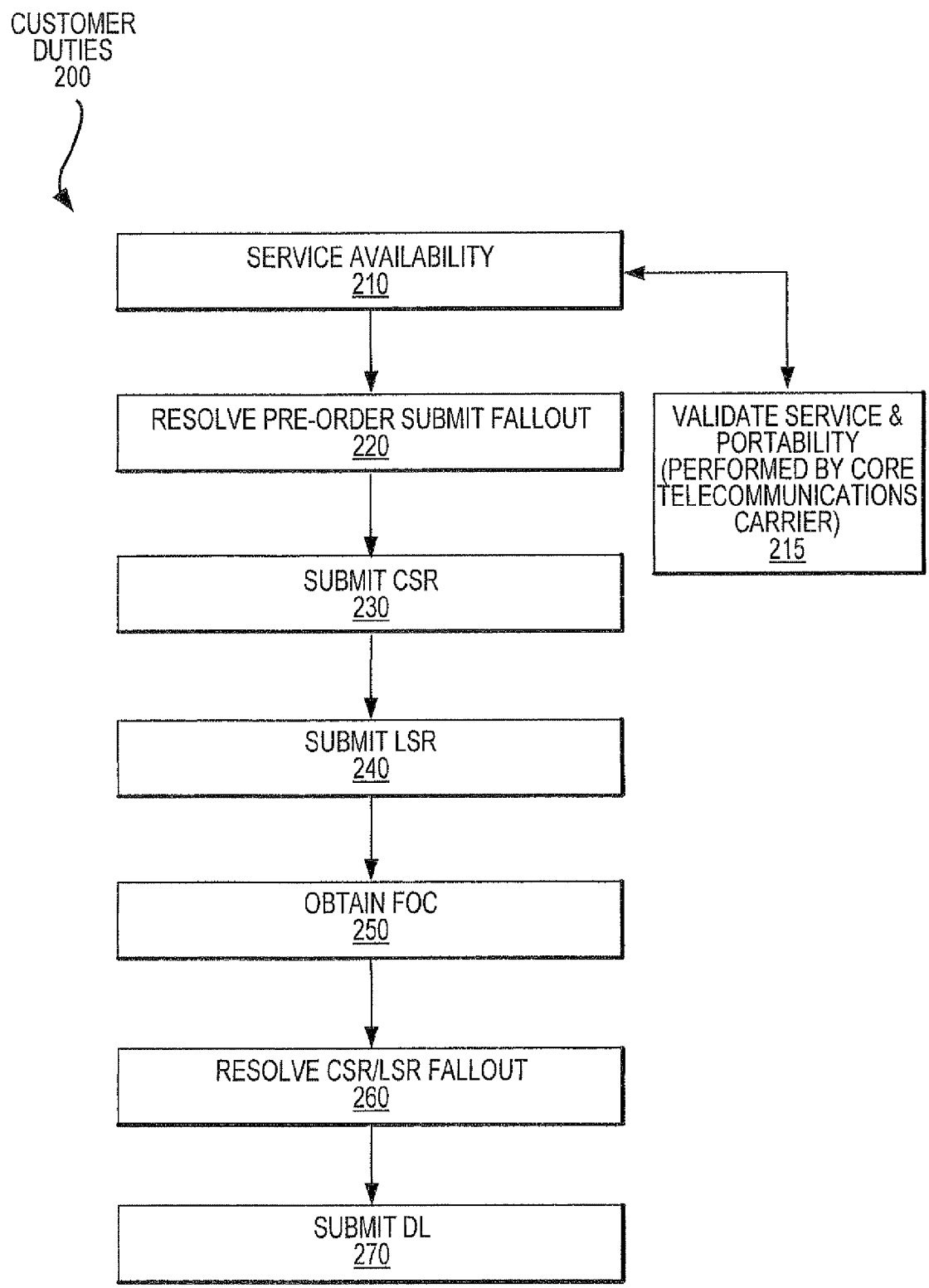
FIG. 2 illustrates a flow diagram depicting tasks associated with a pre-submit process for an LNP order according to an embodiment of the invention.

FIG. 2 is a diagram depicting the tasks and responsibilities associated with the pre-submit process for an LNP order from a customer to a core telecommunications carrier according to an embodiment of the invention. This pre-submit order process includes all the steps that may take place prior to when a TN is actually ported to the core telecommunication carrier's network to help guarantee that a successful LNP takes place.

In one embodiment, the customer is responsible to ensure to the core telecommunications carrier that a TN and an associated subscriber address is actually available within a timeframe requested. The customer is also responsible to resolve any fall out identified as result of the service availability checks. It should be noted that the customer's responsibilities in general for the pre-submit process for LNP vary greatly between a standard LNP business model (such as that described in FIG. 1) and the LSR bypass business model for LNP (which is described in more detail below).

As illustrated in FIG. 2, the pre-submit process 200 for an LNP order begins with the customer checking service availability 210 with the core telecommunications carrier 215 for the LNP order. Then, the customer resolves any pre-order submit fallout 220. In some embodiments, the customer (or the customer in association with a third party) may be fully responsible for the following activities when utilizing the LSR bypass option (described further below). However, responsibility may fall on both the customer and core telecommunications carrier when utilizing a standard LNP option. Such activities may include those related to: submitting CSR requests to the losing LEC 230 and resolving associated CSR fall out 260; submitting LSR requests to the losing LEC 240 and resolving associated LSR fall out 260; obtaining a FOC from the losing LEC and ensuring that obtained the FOC date meets the core telecommunications carrier's minimum Customer Requested Date (CRD) interval 250; and providing and submitting for DL services 270.

In some embodiments, the core telecommunications carrier may provide the customer with a pre-order submit process, such as for process 200 of FIG. 2, which serves both LNP Options (standard and LSR bypass). Table 1 below shows one embodiment of exemplary business rules associated with service availability and calls out the process variations associated with the pre-order submit process 200 described with respect to FIG. 2. Note that the number in brackets under the "Task" column corresponds to the reference numerals of FIG. 2. Also note that references to 'CTC' refer to the core telecommunications carrier. It should be realized that the following business rules are intended to be exemplary and not limiting in any way.

TABLE 1

| Process | Task | Variation | Standard LNP Option | LSR Bypass Option |
| --- | --- | --- | --- | --- |
| Pre-Order Submit | Submit Service Availability Request [210] | Y | Available Order Entry (OE) interfaces: Portal Manual Entry Portal Bulk Load B2B API | Available OE interfaces: B2B API* |
| Pre-Order Submit | Obtain Service Availability Results [210] | Y | Earliest CRD returned is based on: LEC specific OCN interval Min. 5 bus days if time <5 pm EST, else 6 bus. days | Earliest CRD returned is based on: Fixed interval (not LEC specific) Min. 3 bus. days if time <5 pm |

TABLE 1-continued

| Process | Task | Variation | Standard LNP Option | LSR Bypass Option |
|---|---|---|---|---|
| | | | Excluding weekends Excluding public holidays Actual intervals range from 5 to 20 days | MST else 4 bus. days Excluding weekends Excluding public holidays |
| Pre-Order Submit | Resolve Pre-Order Submit Fall Out [220] | N | Customer is responsible to resolve root cause of Error Codes associated with Service Availability Fall Out. | |
| Pre-Order Submit | Real-Time CSR Request [230]** | Y | Recommended but optional Pre-Order Submit task executed by CTC | Not applicable |
| Pre-Order Submit | CSR Request [230] | Y | Post-Order Submit task executed by CTC | Pre-Order Submit task executed by Customer |
| Pre-Order Submit | LSR Request [240] | Y | Post-Order Submit task executed by CTC | Pre-Order Submit task executed by Customer |
| Pre-Order Submit | Obtain FOC [250] | Y | Post-Order Submit task executed by CTC | Pre-Order Submit task executed by Customer |
| Pre-Order Submit | Resolve CSR/LSR Fall Out [260] | N | Pre-Order Submit task executed by Customer | |
| Pre-Order Submit | Submit DL [270] | Y | Post-Order Submit task executed by CTC | Pre-Order Submit task executed by Customer |

Figure 3:
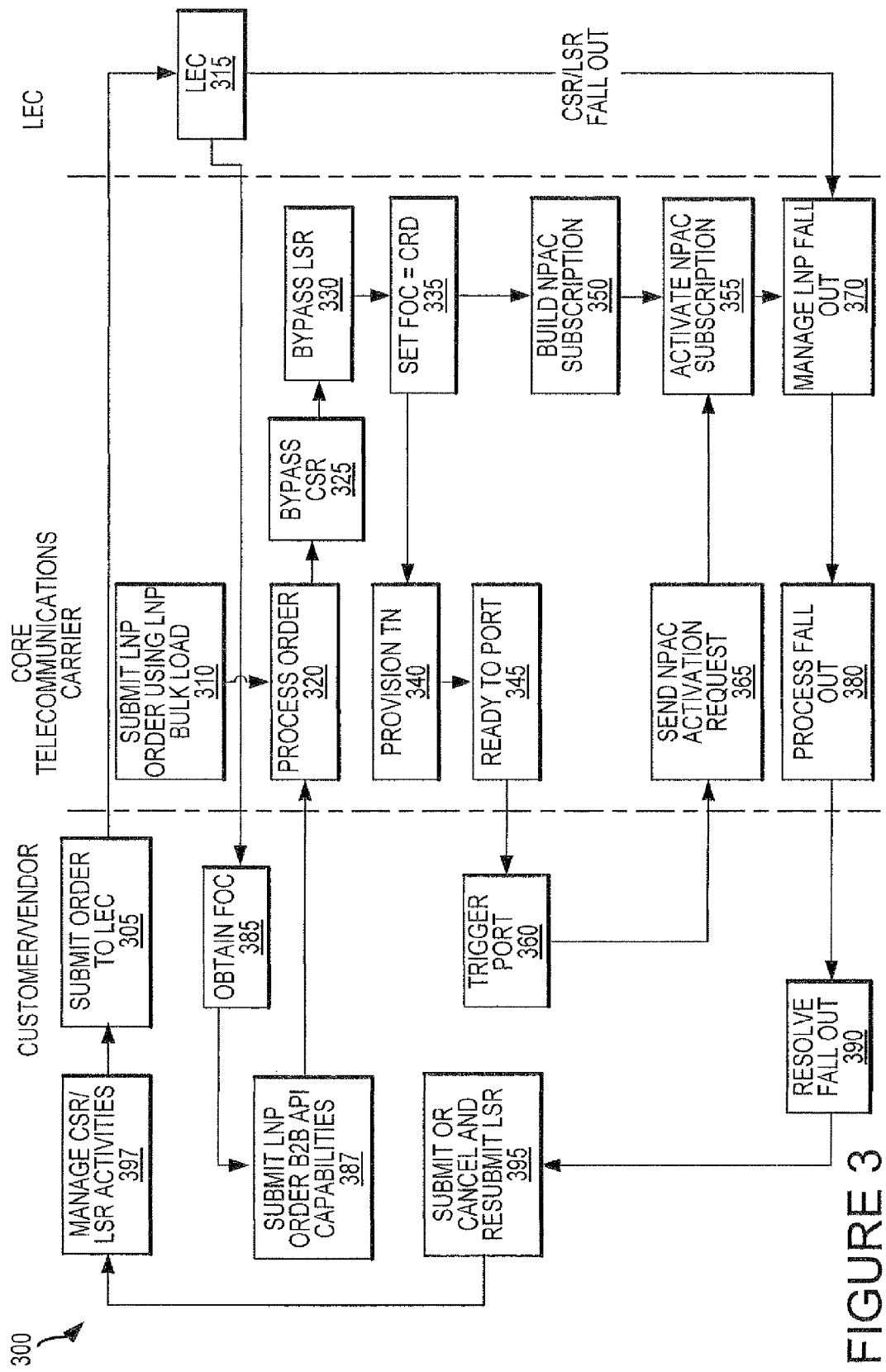
FIG. 3 depicts a flow diagram one embodiment of a Local Service Request (LSR) bypass process for LNP.

*attempts to use LSR Bypass while customer not approved by CTC will be returned with error code Local Service Request (LSR) Bypass FIG. 3 shows a high-level LSR bypass process 300 according to one embodiment of the invention. In some embodiments, a core telecommunications carrier may provide customers with an LSR bypass option to support special business models for customers that involve LNP activities outside of the core telecommunications carrier. This LSR bypass functionality allows customers to port TNs to the core telecommunications carrier using a business-to-business (B2B)-type process, either by themselves or by means of a 3rd party. It may also provide customers the ability to submit specialized orders (by themselves or via alternative porting vendors) to the core telecommunications carrier solely for TN provisioning and NPAC activation activities.

In one embodiment, the core telecommunications carrier may manage the specialized LSR bypass process as illustrated in FIG. 3. The process 300 of FIG. 3 contains many steps that are similar to the standard LNP process 100 illustrated in FIG. 1, and much of the description of FIG. 1 applies to FIG. 3. However, there are some key differences of the LSR bypass process 300 of FIG. 3 in comparison to the standard LNP process 100 of FIG. 1.

One difference is that the customer should use a B2B application programming interface (API) order entry mechanism to submit LSR bypass LNP orders 305, 387 to the core telecommunications carrier. Another difference is that the customer should manage any CSR, LSR, FOC, and DL activities and their associated fall out 390 as part of the LSR bypass LNP process. In some embodiments, if the customer chooses not to perform DL activities himself, the core telecommunications carrier may only offer DL change capabilities once the LSR bypass LNP order is completed. A further difference is that the core telecommunications carrier manages CNAM and NPAC activities and associated fall out (except for "Port-In Conflict").

With respect to embodiments of the LSR bypass functionality for LNP, the processes 200, 300 depicted in FIGS. 2 and 3 are now described in further detail. Note that the numbers in brackets correspond to the reference numerals of FIG. 2.

Determine Service Availability [210]: In some embodiments, a core telecommunications carrier may define LNP service availability for a TN. This definition may provide that the TN should be portable to the core telecommunications carrier Operating Company Number (OCN). Service availability may also include that a TN must be capable of provisioning on the core telecommunications carrier network that has to cover the rate center for that TN. In some cases, certain "E911" requirements should be met, unless the customer chooses to provide 911 services himself or through a third party vendor. Finally, service availability may include that an immediate subsequent LNP order submit request for the TN validated positively be submitted with the "earliest CRD" specified in the service availability results.

In some embodiments, the service availability results obtained by the customer from the core telecommunications carrier system may include at least the following fields: Portability Indicator (Y/N); OCN (Old OCN from losing carrier); LRN (Current LRN); Rate Center; Bulk Load & B2B API only (service availability indicator (Y/N)); Earliest CRD; Latest CRD; LATA; Rate Center State; New OCN; New LRN; E-bonded Flag (Y/N); and Internal Port Indicator (Y/N). These fields may assist later in putting together the LNP order submit request.

Resolve Service Availability Fall Out [220]: Pre-Order Submit fall out occurs when service availability validation for a specific TN fails. In those instances, the core telecommunications carrier returns the service availability results with an error code and description to indicate to the customer why the TN cannot be served by the core telecommunications carrier. In some embodiments, the core telecommunications carrier provides an error code list to all customers. The following Table 2 provides an exemplary list of error codes that the customer may receive from the core telecommunications carrier.

TABLE 2

| Error Code | Error Description | Root Cause | Recommended Customer Action |
|---|---|---|---|
| 00000 | The request was successfully Processed | n/a | n/a |
| 00003 | A null response or internal system error was encountered | TC OSS issue (normally a connection issue w/a TC back office system) | Please note this error and retry after 1 minute. If problem persists, contact support. |
| 00103 | All required data elements are not provided on the request. | The request submitted did not contain all required information or had bad content (e.g., invalid characters). | Check the submitted request, correct bad data elements, and resubmit. |
| 01101 | The TN and address of the request are not in the same coverage area. For non-nomadic E911 options, TN and address must reside in same coverage area. | The rate center associated to the TN requested is not the same as the rate center for the Address requested. | Please revise the request information and resubmit, or recommend an alternate solution to the subscriber. |
| 01105 | The number requested is a toll free number, which cannot be ported at this time. | TC is not able to port a toll free number at this time. | Please recommend an alternate solution to the subscriber. |
| 01106 | The number requested is not found in the LERG and cannot be ported at this time. | TN requested is not portable at this time. | Please revise the request information and resubmit. Retry after 30 days when a monthly LERG update has been performed, or recommend an alternate solution to the subscriber. |
| 01201 | The address entered was not found. | The address submitted was not valid based on TC validation. | Please confirm the detailed address information, revise, and resubmit request. |
| 01301 | Request cannot be processed at this time due to Rate Center coverage. Please contact your Account Manager for assistance. | The rate center requested is not available at this time. | n/a |
| 01305 | Request cannot be processed at this time due to E911 coverage. Please contact your Account Manager for assistance. | E911 coverage is not available in the Rate Center requested. | n/a |
| 01401 | Request cannot be processed at this time due to customer setup within the requested Market. | Customer is not setup properly in the Market requested. | Please contact your Account Manager for assistance. |

CSR Request for LSR Bypass [230]: The following description described CSR Requests that are considered to be part of the Pre-Order Submit process for the LSR bypass for LNP only. In addition, embodiments of the invention provide for a CSR Request option for the standard LNP option. With regard to CSR Request for LSR bypass, prior to submitting a porting request, a Customer Service Record (CSR) is pulled from the losing LEC carrier to determine if the CSR is flagged by the carrier to indicate account details or line features which may potentially affect a subsequent port request. Examples of features that may affect a subsequent port request include, but are not limited to, Name Mismatch, Address Mismatch, or "PIC Freeze".

In one embodiment, the CSR Request for LSR bypass is considered to be the sole responsibility of the customer. In this case, the core telecommunications carrier should not assist with any CSR fall out the customer might experience due to the fact that the core telecommunications carrier does not own the carrier relationship in the business models associated with the LSR bypass LNP option.

In one embodiment, the core telecommunications carrier may use the following name mismatch determination rules to parse the CSR information as follows:

(1) If the first character is a begin parenthesis, remove all characters up to and including the end parentheses
(2) Take any word(s) before a semi-colon and put them at the end
(3) Take any word(s) before a comma and put them at the end
(4) Trim all extra spaces
(5) Remove the following punctuation marks: . , : ; ¿ ¡
(6) Remove the following characters: ! @ # $ % ^ & * ( ) _ + = { } | \ [ ] ? < > / *
(7) Replace hyphen with a space
(8) Residential TNs: validate last name only
(9) Business TNs: validate last name and first name In another embodiment, the core telecommunications carrier may also use the following address mismatch determination rules. If the address matches 3 out of 4 following conditions, then the validation succeeds.

(1) Does the State match?
(2) Does the Zip Match?
(3) Does the City Match?
(4) Does the Address Number and Street Name Match?

LSR Request [240]: To port a TN to the core telecommunications carrier, a Local Service Request (LSR) should be submitted to the losing LEC to obtain approval for the LNP process. In some embodiments, this task is considered to be solely the customer's responsibility. The core telecommunications carrier, in some cases, might not assist with any LSR fall out the customer might experience due to the fact that the core telecommunications carrier does not own the carrier relationship in the business models associated with the LSR Bypass LNP Option.

Obtain FOC [250]: Embodiments of the invention provide that the FOC date obtained from the LEC be used by the customer to submit a LNP order to the core telecommunications carrier, while using the FOC as the CRD on that request. In some case, this may be an important business rule for the LNP order submit process. In addition, this task is considered to be solely the customer's responsibility. The core telecommunications carrier, in some cases, may not assist with any LSR fall out the customer may experience due to the fact that the core telecommunications carrier does not own the carrier relationship in the business models associated with the LSR bypass LNP option.

Resolve CSR/LSR Fallout [260]: The customer is also responsible for resolving any fall out associate with CSR and/or LSR fall out of the above processes. This resolution may include correcting any discrepancies in the CSR request or resolving any issues with the losing LEC that may be preventing the LNP process from occurring. The core telecommunications carrier, in some cases, might not assist with any LSR fall out the customer might experience due to the fact that the core telecommunications carrier does not own the carrier relationship in the business models associated with the LSR Bypass LNP Option.

Submit DL [270]: This task is considered to be part of the Pre-Order submit process for the LSR bypass for LNP process. In one embodiment, the core telecommunications carrier does not provide DL services as part of a regular LSR bypass for LNP orders. Instead, the customer may choose to provide DL services himself, due to the customer's performance of the LSR activities with the LECs. In order to enable the customer to at least send the core telecommunications carrier this DL information, an LSR bypass for LNP orders may still require the DL information to be populated, yet with a DL request type of "REMOVE", for example. This allows the customer to make any adds, moves, and changes after the initial LNP order is successfully completed.

This task is considered to be solely the customer's responsibility. The core telecommunications carrier, in some cases, may not assist with any LSR fall out that the customer may experience due the core telecommunications carrier not owning the carrier relationship in the business models associated with LSR bypass for LNP.

Real-Time (RT) Customer Service Record (CSR)

RT CSR is a LNP functionality that may be utilized as part of the Pre-Order submit process for the standard LNP Option. In one embodiment, as part of a standard LNP order, the core telecommunications carrier may request an advance CSR from the donor LEC for the TN being submitted for LNP. Then, the core telecommunication carrier may perform a multitude of validations on the data returned to help bypass future problems, as detailed below.

Typical CSR-related order fall out remains a high bar for a majority of LNP customers. Often times, a substantial amount of LNP orders for a given customer may be rejected by the core telecommunications carrier based on CSR data validations. Embodiments of RT CSR discussed here use an advance CSR request to preclude later rejections downstream in the actual LSR process associated with the donor LEC.

Embodiments of invention allow customers to utilize a simplified CSR request capability before an LNP order is submitted, known as a RT CSR. As part of RT CSR, CSR data will be returned in a near real-time fashion and corrections to upcoming LNP orders may be made before submitting the actual order to the core telecommunications carrier. Utilizing the novel RT CSR request capability may dramatically reduce the LNP order fall out encountered, resulting in standard porting Service Level Agreements (SLAs) being achieved on nearly all orders submitted, and thereby providing an improved customer experience.

Embodiments of the RT CSR request capability are available through various entry options. These options include manual entry, bulk entry, and B2B API. In addition, the RT CSR request capability may be utilized for TN's controlled by "E-Bonded" Carriers (LECs). "E-Bonded" means the core telecommunications carrier has automated interfaces established with the donor LEC in question. In some embodiments, the RT CSR request capability results may also be expected within a short time frame after the core telecommunications carrier has submitted the data to the donor LEC. However, occasional RT CSR requests might return a "CSR Not Available" error.

Prior to executing a RT CSR request, a "Service Availability" request should be executed for each TN to obtain a positive result. In the case of the Bulk Load and B2B API based service availability capability, a customer should also obtain the "E-Bonded=Y/N" results to identify if the OCN for that TN is considered "E-Bonded". Customers are responsible to validate the returned CSR data for warnings and/or errors that indicate that an action must be taken by the customer before submitting the data as part of an LNP order. Customers may also be responsible to validate the returned CSR data for port-inhibiting features on which action must be taken by the customer before submitting the data as part of an LNP order. In some cases, the customer may have to request that the subscriber contact the donor LEC to remove those features.

Figure 4:
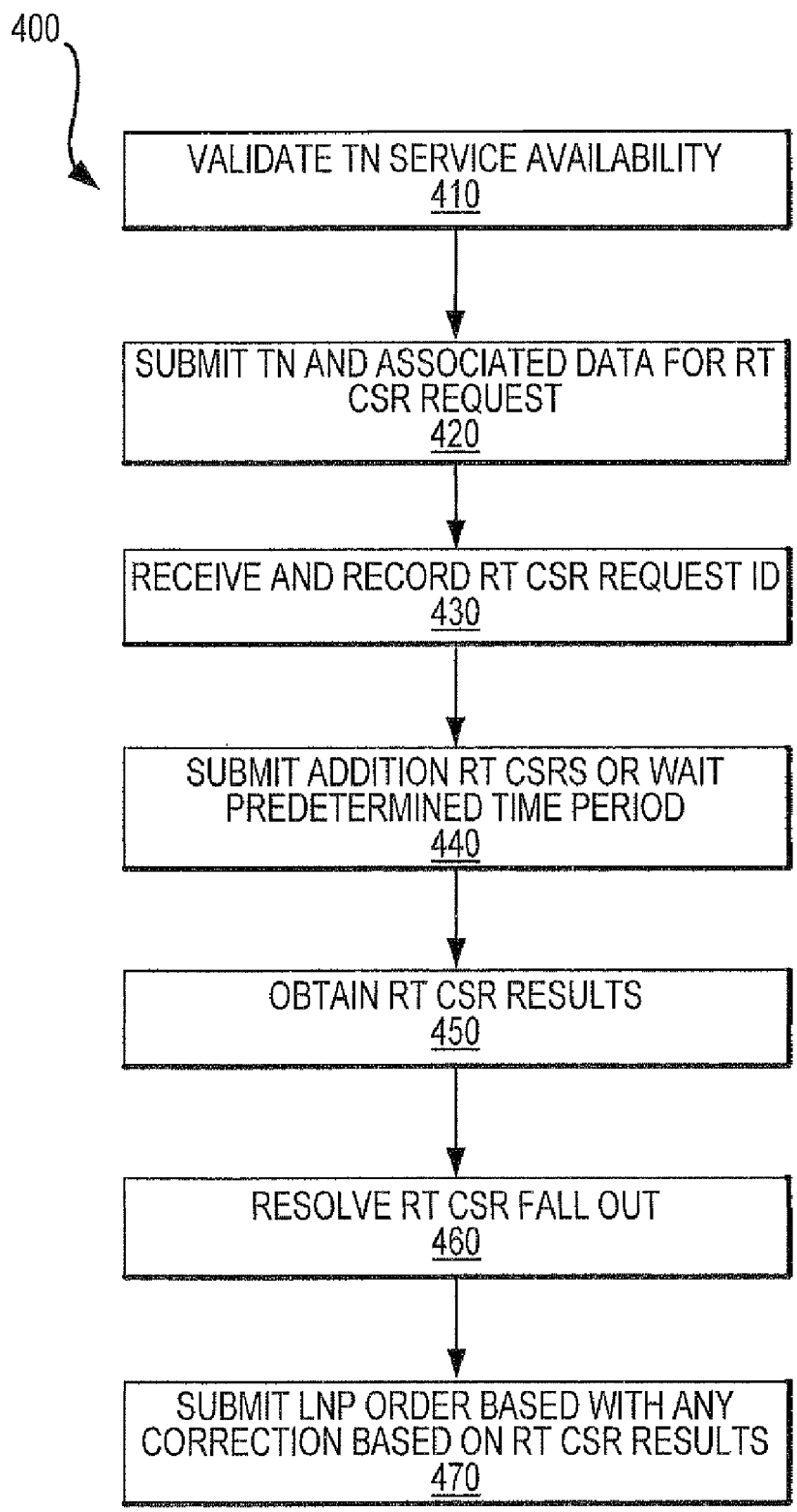
FIG. 4 is a flow diagram depicting one embodiment of a process for real-time (RT) customer service request (CSR)

Further details of embodiments of the RT CSR request process are now described with respect to FIG. 4, which is a flow diagram depicting a process for RT CSR 400 according to one embodiment of the invention. At processing block 410, prior to executing the CSR Request, the customer should validate positive TN service availability. In some embodiments, the service availability capability by manual entry does not return any "E-Bonded" information for a Carrier OCN returned. At this point, the customer should continue with all TNs that are serviceable. For customers utilizing a bulk load or B2B API capability, the customer should validate the successful service availability results for the "E-Bonded Y/N" information for the carrier OCN returned and continue only with those TNs listed as "E-Bonded=Y". If the customer does continue with any TNs which are not considered E-Bonded, they may obtain an error on these TNs with the RT CSR results downstream.

Then, at processing block 420, utilizing the RT CSR request functionality, the customer should enter each TN and its associated name and address data (manually or via other formats for bulk load and B2B API) and submit the entry. A RT CSR request ID is returned and should be recorded by the customer at processing block 430. At processing block 440, if the customer has no intention to request RT CSR's for further TN's, they should wait for the duration of a predetermined time window, or else continue to submit other RT CSR requests at any time during this time window.

Next, at processing block 450, the customer may obtain CSR information by selecting an option to check results or by searching for the CSR Request by using the recorded CSR Request ID. In some cases, the customer may obtain a message that the information will be available later or not at all. At this point, the customer may view the results and check for potential fall out. For instance, non-Ebonded TNs will be tagged with an error code for the manual entry capability. Finally, if the RT CSR data is completely clean, the customer may proceed with an option to immediately continue to an order screen workflow without reentering the data.

In some embodiments of the invention, the customer may have to handle RT CSR request fall out 460. The following common corrective action steps may be used to resolve fall out:

1. Identify if RT CSR data is returned (SUCCESS) or if no RT CSR data is returned (ERROR). In some embodiments, the following exemplary RT CSR request-related error codes may be experienced, as detailed in Table 3:

TABLE 3

| Result Code | Message | Context |
|---|---|---|
| 1145 | The system to process your request is currently unavailable. Please try again later. | If the unavailability time exceeds 15 min., please call Support. |
| 1146 | The BTN which was entered on CSR request is invalid. | Please correct the BTN and resubmit the CSR request. |
| 1147 | The TN which was entered on CSR request is not portable. | CTC is not able to port your TN to CTC's network. |
| 1148 | A CSR could not be retrieved on line for the TN which was entered on the CSR Request, due to carrier not supporting automated CSR for the OCN of that carrier. | Please continue to submit an order with the data available. CTC will obtain CSR information and will flag eventual fallout with a WARNING or JEOPARDY. |
| 1153 | CSR not available at this time, please resubmit the request later. | You may choose to attempt to return CSR data at a later time. Expect up to 24 hrs maximum waiting time. |

2. For successfully returned RT CSR data only, the customer should validate if the record is tagged with a warning code. Some exemplary warning codes and their context are shown below in Table 4:

TABLE 4

| Warning Code | Warning Description | Corrective Action |
|---|---|---|
| LNP105S | The CSR Information is not available for all TNs on this request. | Applies to TN ranges with a unique BTN for which not all CSR results could be obtained. Validate for which TNs a CSR was obtained and submit a new request for the TNs missing. |
| LNP101W | An address mismatch was found on this CSR Request. | Applies to business type TNs only. Validate mismatch with subscriber and submit LNP order with corrected data to prevent LNP order fall-out. |
| LNP110W | A name mismatch was found on this CSR Request. | Validate mismatch with subscriber and submit LNP order with corrected data to prevent LNP order fall-out. |
| LNP116W | This CSR Request was incorrectly indicated as a Business or Residential TN. | Validate mismatch with subscriber and submit LNP order with corrected data to prevent LNP order fall-out. |
| LNP997W | This TN qualifies as an Internal Port. | This code is provided for informational purposes only and requires no additional action. CSR data will be obtained from the Level 3 service image record on file. |

3. In the case where the TN submitted is of type "Residential," the customer will have to compare the RT CSR address with the submitted address utilizing the following rule set. Note that if the address matches 3 out of the 4 below criteria, the validation may be called successful.
   (a) Does the State match?
   (b) Does the Zip match?
   (c) Does the City match?
   (d) Does the Address Number and Street Name match?

4. For successfully returned RT CSR data only, the customer should check if the record is tagged with a CSR feature. In addition, the customer should identify port-prohibiting features as listed below and take corrective action by reviewing the feature with the subscriber and submitting an LNP order after the donor LEC has removed the feature to prevent future LNP order fall out. Port-prohibiting features include, but are not limited to: 800 Number; Foreign Exchange; ISDN; Local Service Provider (LSP) Freeze; and Remote Call Forward. The following features are not port-prohibitive, but might affect the subscriber: Centrex; Contracted; Custopak; DSL; Distinctive Ring; and Hunting Feature.

Finally, at processing block 470, the customer should proceed with the LNP order request with any corrections to the order made based on the results of the RT CSR.

Port Check Tool (PCT)

Some embodiments of the invention may additionally utilize a port check tool (PCT). The PCT allows a core telecommunications carrier to determine (1) at what point in time the core telecommunications carrier may provision a TN on its network (port in); (2) at what point in time the core telecommunications carrier may remove the TN from its network (port out); and/or (3) at what point in time the core telecommunications carrier may migrate the TN from one customer on its network to another customer on its network (migrate). In some embodiments, the PCT may be deployed as software in the core telecommunications carrier's network.

Figure 5A:
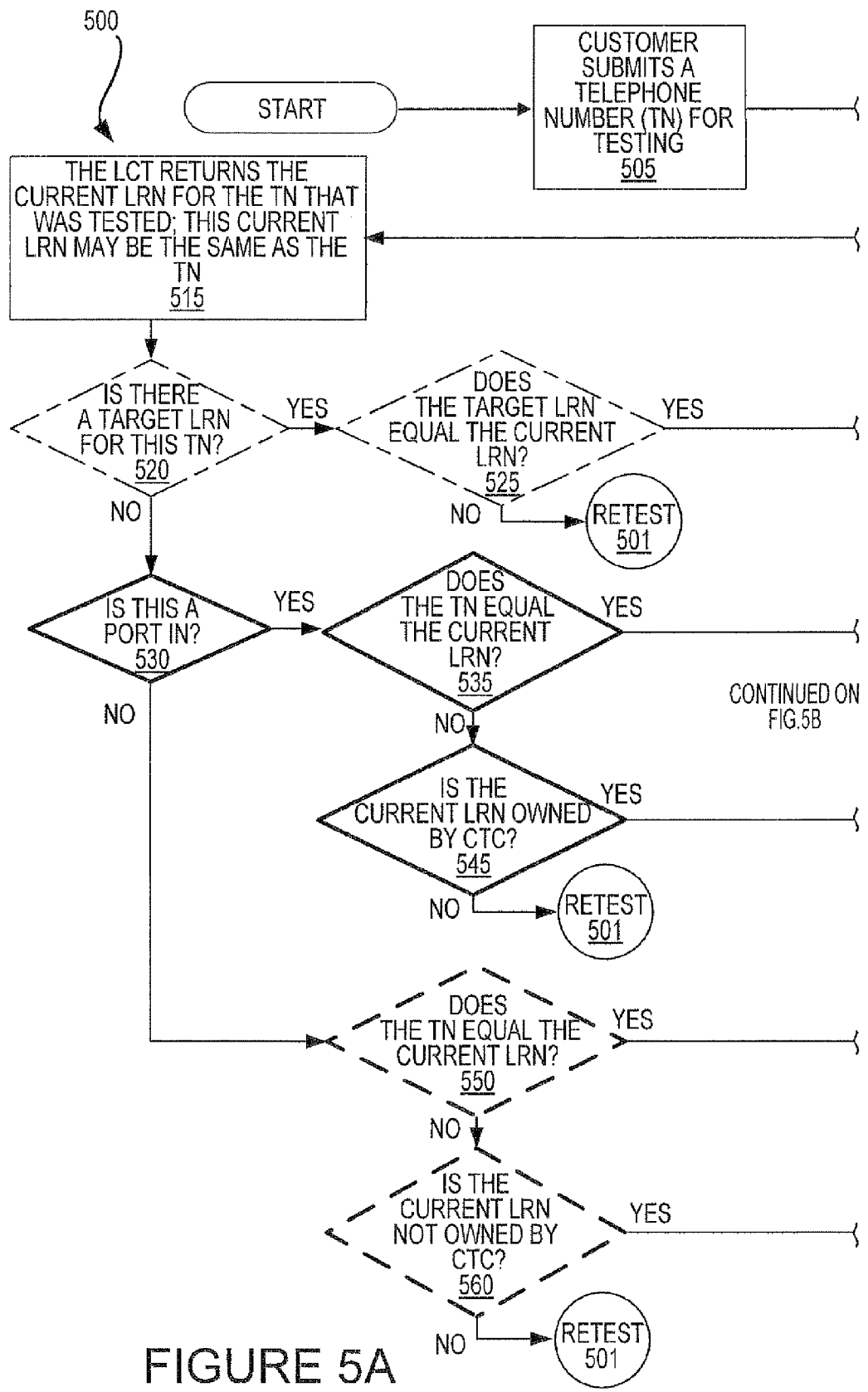
FIGS. 5A and 5B are as flow diagrams depicting one embodiment of a process of a port check tool (PCT)
Figure 5B:
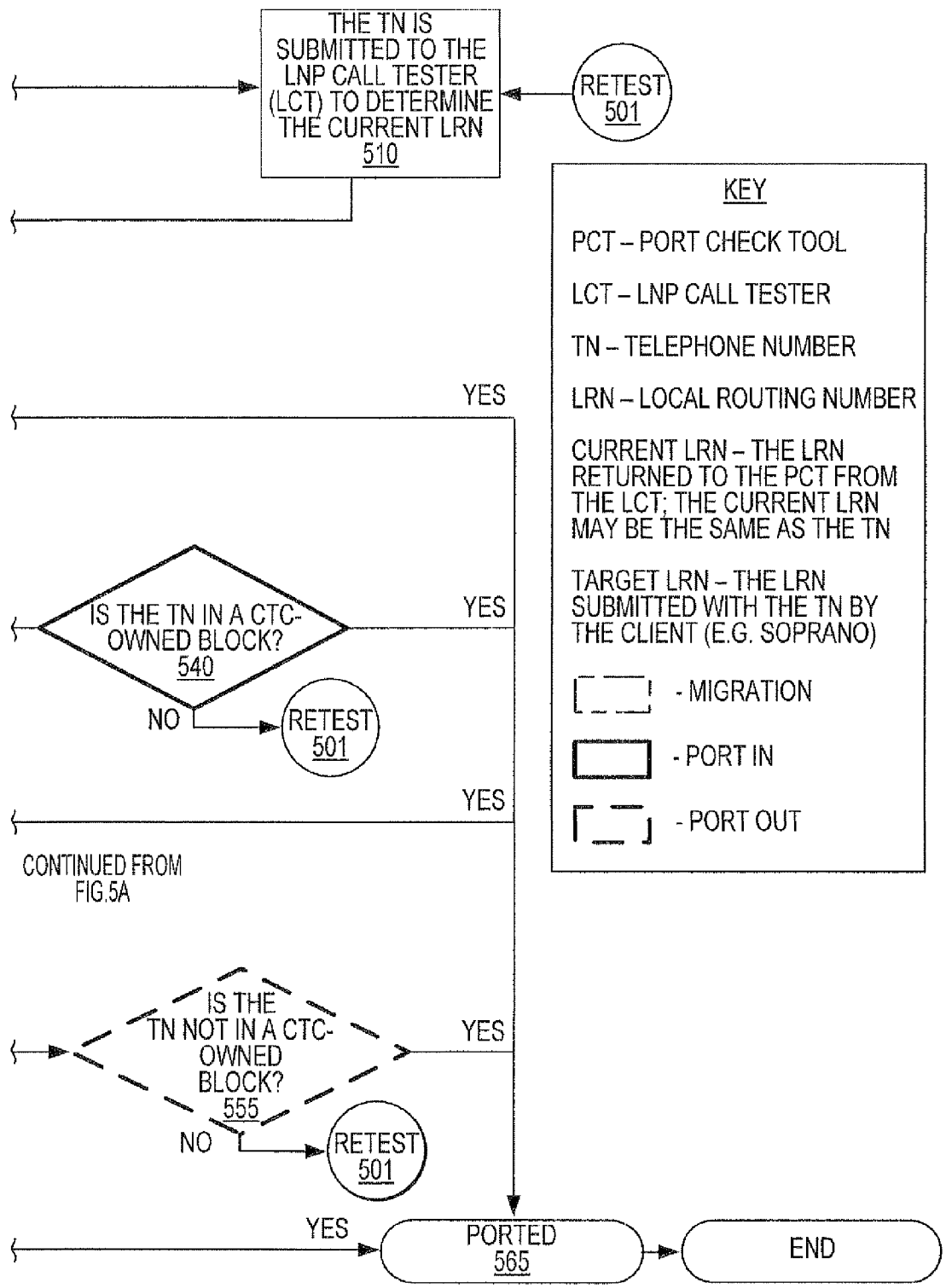

In one embodiment, the PCT is given a TN and may be told the specific port activity (in or out), although this is not necessary. The PCT then checks through a LNP call tester (LCT) on the core telecommunications carrier's network, which references a subset of LERG data, to determine a current LRN for the TN being tested. Utilizing this current LRN, the PCT is able to determine whether a TN has been ported in, ported out, or migrated. FIGS. 5A and 5B depict the process flow by which the PCT determines porting status for the core telecommunications carrier.

Process 500 is an exemplary method performed by a PCT of a core telecommunications carrier. Process 500 begins at process block 505 where a customer submits a TN for testing by the PCT. At processing block 510, the TN is submitted to a LNP call tester (LCT) to determine the current LRN. Then, at processing block 515, the LCT returns the current LRN for the TN that was tested. In some embodiments, this current LRN may be the same number as the TN.

Subsequently, at decision block 520, the PCT determines whether there is a target LRN for this TN. If so, the PCT determines whether the target LRN equals the current LRN 525. If this scenario is true, then the PCT is able to successfully determine that the TN has been ported 565 via migration. However, if the target LRN does not equal the current LRN at decision block 525, then the PCT sends the TN back for a retest 501 as the TN has not yet been ported.

Returning to decision block 520, is there is not a current LRN for the TN, then the process continues to decision block 530, where it is determines whether the TN is being ported in. If the TN is operating under a "Port In" status, then the process moves to decision block 535, where it is determined whether the TN equals the current LRN. If the TN does equal the current LRN, then at decision block 540 it is determined whether the TN is in a block of TNs owned by the core telecommunications carrier. If so, then the PCT is able to successfully determine that the TN has been ported 565 via a port in process. If the TN is not owned by the core telecommunications carrier, then the PCT sends the TN back for a retest 501 as the TN has not yet been ported.

Returning to decision block 535, if the TN does not equal the current LRN, then the process continues to decision block 545 where it is determined whether the current LRN is owned by the core telecommunications carrier. If so, then the PCT is able to successfully determine that the TN has been ported 565 via a port in process. If the LRN is not owned by the core telecommunications carrier, then the PCT sends the TN back for a retest 501 as the TN has not yet been ported.

Revisiting process block 530, if is determined that the TN is not being ported in, then the process defaults to the scenario where the TN is being ported out and continues to decision block 550. At decision block 550, the PCT determines whether the TN equals the current LRN. If the TN does equal the current LRN, then at decision block 555 it is determined whether the TN is not owned by the core telecommunications carrier. If so, then the PCT is able to successfully determine that the TN has been ported 565 via a port out process. If the TN is owned by the core telecommunications carrier, then the PCT sends the TN back for a retest 501 as the TN has not yet been ported.

Returning to decision block 550, if the TN does not equal the current LRN, then the process continues to decision block 560 where it is determined whether the current LRN is not owned by the core telecommunications carrier. If so, then the PCT is able to successfully determine that the TN has been ported 565 via a port out process. If the LRN is owned by the core telecommunications carrier, then the PCT sends the TN back for a retest 501 as the TN has not yet been ported.

Embodiments of the invention allow a PCT, by performing process 500 of FIGS. 5A and 5B, to determine whether a particular TN has been ported, and also specifically to determine whether the TN has been ported in, ported out, or migrated.

Port Triggering

One embodiment of the invention provides customers with the ability to trigger the activation sequence of the porting process for the TNs associated with their orders. For a customer enabled with this port trigger capability, all orders are set up to await the port trigger by the customer. In one embodiment, the customer is able to trigger the porting on the FOC date only. On the FOC date, if there are orders not yet triggered by a configurable activation time defined in a customer's profile (usually at the end of the business day), those orders will then be automatically activated.

Some embodiments of the invention allow for the customer to submit new port triggering orders thru a portal using manual entry or bulk entry. In some embodiments, customers with B2B API capabilities may also submit new port trigger orders through API connections with the core telecommunications carrier once they have implemented the port trigger application.

Figure 6:
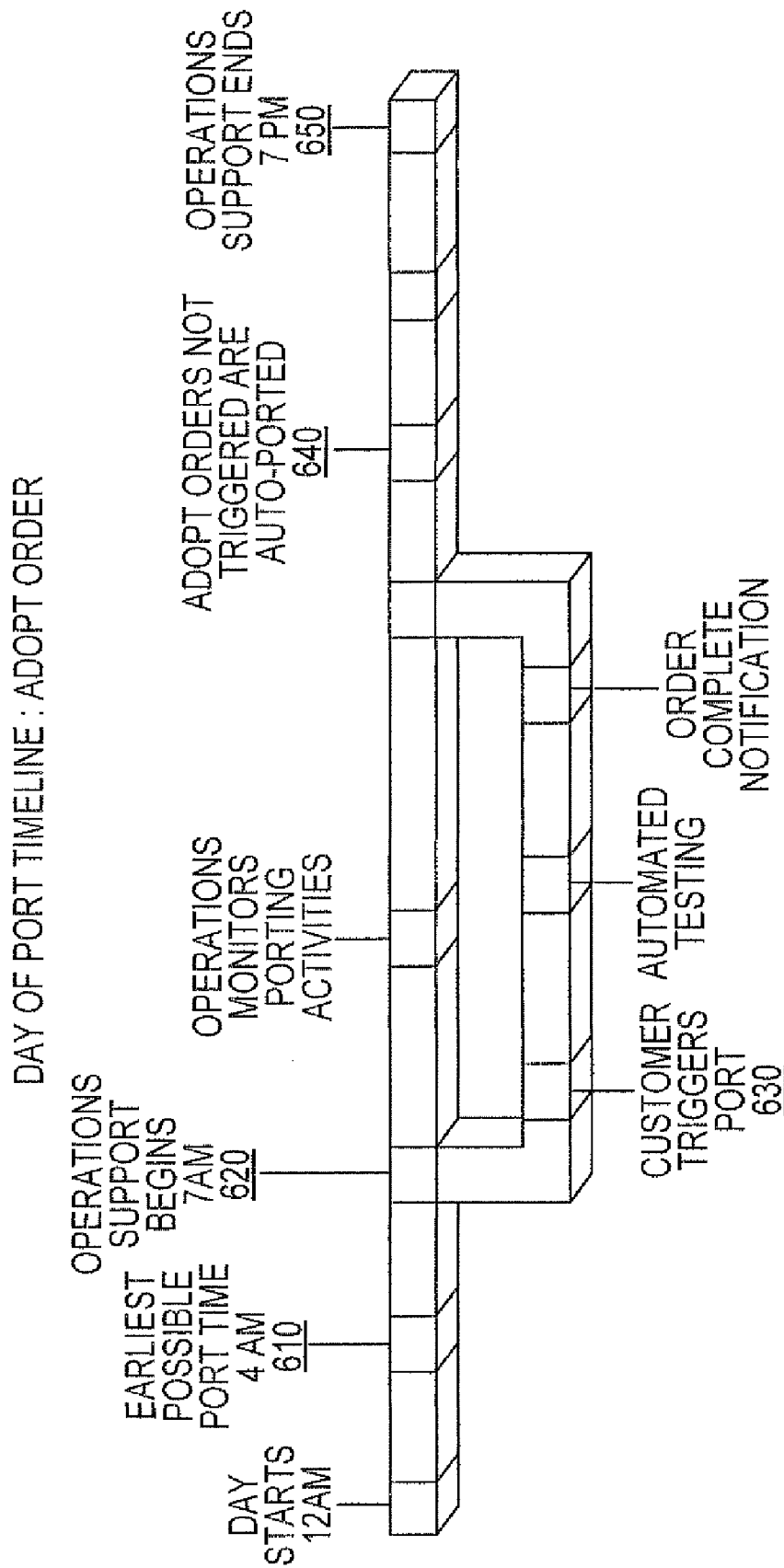
FIG. 6 is a timeline depicting the stages of a port trigger capability for LNP according to one embodiment of the invention.

FIG. 6 is a timeline depicting one embodiment of the stages of the port trigger capability, particularly in reference to the FOC date of the customer. With reference to FIG. 6, port trigger milestones include: (1) 4 am: earliest possible port trigger time 610; (2) 7 am: core telecommunications carrier helpdesk opens and customers are able to receive support with port triggering 620; (3) Port Trigger Time: customer can trigger ports for orders with a FOC date of "today" at their time of choice 630; (4) Activation Time: all remaining orders with a FOC data of "today" which have not been triggered for porting will be automatically ported at the Activation Time 640; and (5) 7 pm: core telecommunications carrier helpdesk closed 650.

In one embodiment, as part of the port triggering functionality, customers should enable port triggering in their customer profile. Whether a customer is planning to use the core telecommunication carrier's portal or order service B2B API to submit orders using the port triggering workflow, profile parameters must be established. The following parameters should be set: (1) "Port Trigger Y/N" needs to be set to "Y"; (2) "AutoPort Y/N" needs to be set to "Y"; and (3) "Activation Time" needs to be specified by the customer in MST. Other parameters may also be set in addition to the above parameters.

Figure 7B:

The port triggering process beings with a search for the Customer Order to be ported. In some embodiments, the customer may search by Order ID or NPA-NXX. FIGS. 7A and 7B are screenshots depicting various embodiments of customer order summary windows that display a summary of an LNP order that was searched. The Customer Order Summary screen allows the customer to review order detail for status and other information. For LNP orders, an LNP Event Summary section may also be displayed in the order summary window, such as that depicted in FIG. 7B. In some embodiments, the LNP Event Summary section is only present for LNP order requests. It is used to clearly communicate the event stages that occur between time of request and fulfillment allowing the customer to isolate and identify the action status of LNP order request.

With specific reference to the customer order summary of FIG. 7A, an Activation Type of "customer-initiated" represents a customer with port triggering profile settings. A customer without this profile setting may instead have "core telecommunications carrier-initiated" as the Activation Type. This field allows the customer to verify that the profile has been set accordingly. When the timing is right to activate the port process, the "Trigger Porting" button displays on the customer order summary window and the Customer Commit Date matches "today's" date. In addition, the General Information section will be updated to reflect that port activation has been initiated and where to turn for further assistance.

In some embodiments, if an order contains multiple TNs, the port triggering function may activate all TNs on the respective order. In addition, if conditions for triggering ports are not met, the "Trigger Porting" button may not display. A successful triggering of port will result in a "Port Initiated" message being displayed to the customer. In some embodiments, this message may request that the customer allow a predetermined period of time before testing the success of the port. Note that the port may be completed and the TN activated well before the time window has passed—however, the customer should allow at least the period of the time window before initiating any troubleshooting.

In one embodiment, to validate a port triggering occurrence or stage of activation, the customer may work from the Order Summary screen of FIG. 7B and click "Return to Search Results" then click the "Search" button again. The LNP status fields may show an updated status each time this action is performed. The following exemplary LNP status values described in Table 5 may be monitored, but are not intended as limiting LNP status indicators for embodiments of the invention.

TABLE 5

| LNP Status (in sequence of port activation) | Description |
| --- | --- |
| Ready to Port Send | An NPAC Activation Request is sent to the LEC. |
| Port Failed | The NPAC Activation Request was not successful. Call the LNP helpdesk to resolve. |
| Testing | Level 3 is currently testing the ported TNs. |
| Completed | The porting activity is completed. |

In some embodiments, the port triggering functionality may also come with specific port triggering portal error codes that might be encountered upon triggering ports. Some exemplary, non-limiting errors codes, with their corresponding descriptions, are depicted below in Table 6.

TABLE 6

| Error Code | Message | Description |
| --- | --- | --- |
| 1903 | No Pending Order | No pending order matching the port triggering request |
| 1905 | Already Ported | Request could not be processed because the order has already been ported |
| 1906 | Cancel Request | Request could not be processed because a cancel request has been submitted for this order |
| 1907 | Port Initiated within the past hour | Request could not be processed because the port has already been initiated |
| 1908 | Before Porting Start Time | Request could not be processed because the porting window is closed |
| 1909 | Not FOC date | Request could not be processed because today is not the service commitment date for this order |

In some embodiments, attempting to activate the port trigger process out of the port triggering time frame can result in a response as seen the screen shot of FIG. 8, which depicts one embodiment of a potential error result that may be presented to a customer.

FIG. 9 is an example of a computer system 900 with which embodiments of the present invention may be utilized. Computer system 900 may represent any of the components in the core telecommunications carrier or in the customer, which may implement one or more of the methods discussed herein for improved functionalities for LNP. In this simplified example, the computer system 900 comprises a bus 901 or other communication means for communicating data and control information, and one or more processing devices 902, such as a well known processor, Application Specific Integrated Circuit (ASIC), a field programmable gate array (FPGA), or the like, coupled with bus 901.

In this simplified embodiment, computer system 900 further comprises a random access memory (RAM) or other dynamic storage device (referred to as main memory 904), coupled to bus 901 for storing information and instructions to be executed by processing device 902. Main memory 904 also may be used for storing temporary variables or other intermediate information during execution of instructions by processor(s) 902.

Computer system 900 can also include a read only memory (ROM) 906 and/or other static storage device coupled to bus 901 for storing static information and instructions for processing device 902. A mass storage device 907, such as a magnetic disk or optical disc and its corresponding drive, may also be coupled to bus 901 for storing instructions and information, such as configuration files, a key store and registration database, etc. Such ROM 906 may comprise, for example, one or more databases in which information may be stored and/or retrieved, such as, for example, information received or sent via network architectures 100, 200, or 400.

One or more communication ports 903 may also be coupled to bus 901 for supporting network connections and communication of information to/from the computer system 900 by way of a communication network, such as a Local Area Network (LAN), Wide Area Network (WAN), or the Internet, for example. The communication ports 903 may include various combinations of well-known interfaces, such as one or more modems to provide network access, one or more 10/100 Ethernet ports, one or more Gigabit Ethernet ports (fiber and/or copper), or other well-known network interfaces commonly used in internetwork environments. In any event, in this manner, the computer system 900 may be coupled to a number of other network devices, communication devices, clients, NTMs, and/or servers via a conventional communication network infrastructure.

Optionally, operator and administrative interfaces (not shown), such as a display, keyboard, and a cursor control device, may also be coupled to bus 901 to support direct operator interaction with computer system 900. Other operator and administrative interfaces can be provided through network connections connected through communication ports 903.

Finally, removable storage media (not shown), such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 901 via corresponding drives, ports or slots.

Embodiments of the invention have now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method comprising:
receiving a telephone number (TN) to test for its porting activity as part of a local number portability (LNP) order, wherein the porting activity includes at least one of port in, port out, and migration of the TN;
accessing a LNP call tester (LCT) to determine a current local routing number (LRN) for the TN; and
determining, based on the TN and current LRN, whether the porting activity is completed for the TN in relation to a core telecommunications carrier servicing an owner of the TN, wherein determining whether the porting activity is completed for the TN includes analyzing the status of both the current LRN and TN, and wherein if there is a target LRN for the TN and the target LRN is equal to the current LRN, then the LCT determines that the porting activity of the TN is a completed migrated, and wherein if the TN equals the current LRN and the TN is in a block of TNs owned by the core telecommunications carrier, then the LCT determines that the porting activity of the TN is a completed port in, and wherein if the TN equals the current LRN and the TN is not in a block of TNs owned by the core telecommunications carrier, then the LCT determines that the porting activity of the TN is a completed port out.

2. The method of claim 1, wherein the porting activity for the TN associated with the LNP order is known prior to determining whether the porting activity has been completed.

3. The method of claim 1, wherein the LCT is part of a network of the core telecommunication carrier.

4. A system, comprising:
a database to determine a local routing number associated with a TN, the TN part of a local number portability (LNP) order; and
a LNP call tester (LCT) communicably coupled to the database to test a porting activity of the TN as part of the LNP order and configured to: receive the TN in order to test for its porting activity, wherein the porting activity includes at least one of port in, port out, and migration of the TN;
determine the current LRN by querying the database; and
determine, based on the TN and current LRN, whether the porting activity is completed for the TN in relation to a core telecommunications carrier servicing an owner of the TN, wherein determining whether the porting activity is completed for the TN includes analyzing the status of both the current LRN and TN, and wherein if there is a target LRN for the TN and the target LRN is equal to the current LRN, then the LCT determines that the porting activity of the TN is a completed migrated, and wherein if the TN equals the current LRN and the TN is in a block of TNs owned by the core telecommunications carrier, then the LCT determines that the porting activity of the TN is a completed port in, and wherein if the TN equals the current LRN and the TN is not in a block of TNs owned by the core telecommunications carrier, then the LCT determines that the porting activity of the TN is a completed port out.

5. The system of claim 4, wherein the porting activity for the TN associated with the LNP order is known prior to determining whether the porting activity has been completed.

6. The system of claim 4, wherein the LCT is part of a network of the core telecommunication carrier.

7. An article of manufacture, comprising:
a non-transitory computer-accessible medium including data that, when accessed by a computer, causes the computer to perform operations comprising:
receiving a telephone number (TN) to test for its porting activity as part of a local number portability (LNP) order, wherein the porting activity includes at least one of port in, port out, and migration of the TN;
accessing a LNP call tester (LCT) to determine a current local routing number (LRN) for the TN; and
determining, based on the TN and current LRN, whether the porting activity is completed for the TN in relation to a core telecommunications carrier servicing an owner of the TN, wherein determining whether the porting activity is completed for the TN includes analyzing the status of both the current LRN and TN, and wherein if there is a target LRN for the TN and this target LRN is equal to the current LRN, then the LCT determines that the porting activity of the TN is a completed migrated, and wherein if the TN equals the current LRN and the TN is in a block of TNs owned by the core telecommunications carrier, then the LCT determines that the porting activity of the TN is a completed port in, and wherein if the TN equals the current LRN and the TN is not in a block of TNs owned by the core telecommunications carrier, then the LCT determines that the porting activity of the TN is a completed port out.

8. The article of manufacture of claim 7, wherein the porting activity for the TN associated with the LNP order is known prior to determining whether the porting activity has been completed.

* * * * *